Patented June 13, 1950

2,511,218

UNITED STATES PATENT OFFICE 2,511,218

TITANIUM OXIDE PIGMENT PRODUCTION

Carl Marcus Olson, Newark, and James Eliot Booge, Wilmington, Del., assignors to E. I. du Pont de Nemours & Company, Wilmington, Del., a corporation of Delaware No Drawing. Application July 1, 1946,
Serial No. 680,846

11 Claims. (Cl. 23—202)

This invention relates to the manufacture of titanium oxide pigments and particularly to the preparation of improved white titanium oxide pigments which exhibit, on X-ray analysis, substantially the diffraction pattern of rutile.

More specifically, the invention pertains to novel methods for producing rutile titanium oxide pigments by conversion of anatase titanium oxide obtained from the hydrolytic precipitation of titanium salt solutions, especially titanium sulfate, seeded with a small amount of a novel type of nucleating or accelerating agent.

The present application is a continuation-in-part of our copending application Serial No. 426,248, filed January 9, 1942, now abandoned.

Titanium oxide crystallizes in three different forms, namely, anatase or octahedrite, brookite and rutile. These forms vary in density and in refractive index, anatase having a refractive index of 2.53, brookite 2.64, and rutile 2.71. The hiding power of the colorless $TiO_2$ pigment will depend upon its fineness and refractive index, the higher the refractive index value, the greater being its potential pigment hiding power. Since rutile possesses the highest refractive index value, its greater attractiveness as a pigment is apparent.

Anatase and rutile comprise the forms most suitable for use as $TiO_2$ pigments. Except those of U. S. Patent 2,253,551 prior commercial titanium pigments are characteristically in the lower (anatase) modification. This is principally due to the fact that more economical and commercially attractive methods are available for producing anatase because the titanium sulfate solutions from whence they usually result upon hydrolytic precipitation are more readily prepared through the dissolution of titaniferous ores, such as ilmenite, with sulfuric acid in accordance with well-known methods. Rutile, on the other hand, may be obtained from titanium chloride solutions, but an extremely difficult and costly type of operation is required in which careful controls must be constantly exercised and serious corrosion and other problems are ever present. Hence, processes affording production at a reasonable cost of a rutile pigment having both proper fineness and acceptable color enabling their commercial exploitation have not been heretofore available.

When hydrous titanium oxide, such as results from the hydrolysis of a titanium sulfate solution in accordance with, for example, the methods of U. S. Reissue Patent 18,854, is calcined at temperatures ranging from about 900° C.–950° C., pigment anatase results. If the calcination is conducted at higher temperatures, above, say, 1000° C., 1050° C., 1100° C., or higher, conversion of the anatase will take place and rutile will comprise the final product. However, such product fails to exhibit the potentially higher hiding power and tinting strength of the higher, rutile modification because the high temperatures required cause an undesired sacrifice of particle size, color, and other essential pigment properties. Thus, the excessive temperatures which must be employed cause sintering, agglomeration and grit and aggregate formation, induce objectionable particle size growth, and render the ultimate product too coarse for maximum hiding power, all of which is reflected in the relatively poor color, brightness, texture, tinting strength and hiding power exhibited by the final product. Undesirably poor in these essentials, especially hiding power and color, the product becomes unfit for many intended use, particularly in coating compositions (paints, enamels, lacquers, etc.) wherein the pigment component must possess these necessary properties. Obviously, these high temperature conversion processes for obtaining rutile from anatase likewise fail to provide an acceptable, commercial form of rutile pigment.

It has been found that these and other disadvantages in prior efforts to produce commercially acceptable pigment rutile can be effectively remedied. It is among the salient objects of this invention to provide novel methods and means for achieving that result. Also, it has been found that the character of a raw pigment hydrolysate and the ultimate titanium oxide pigment are greatly influenced by the type of accelerating or seeding agent which is employed in their production and by the past history and manner of their preparation. A specific object of the invention, therefore, is to provide a novel type of nucleating agent which, when employed in the hydrolysis of a titanium salt, especially titanium sulfate, solution, advantageously imparts to the hydrolysis precipitate certain novel and peculiar characteristics, whereby said precipitate, due to its unusual type, state or condition, readily converts to rutile to produce a high-quality pigment when calcined at relatively low temperatures, e. g., comparable to those normally employed in anatase pigment manufacture. An additional, specific object is to provide a novel method for obtaining a rutile pigment possessing both high hiding power and excellent color characteristics, and such other essential properties as desired tinting strength, opacity, smallness and uniformity of particle size, texture, brightness, oil absorption, etc. Other objects and advantages will be apparent from the ensuing description of the invention.

These and other objects are attainable in this invention which embodies the discovery that when the nucleating or accelerating agent used in the hydrolysis of a titanium salt solution is prepared by treating hydrous titanium oxide under controlled conditions with respect to both basicity and acidity, it will so markedly affect the properties of the precipitate (especially anatase) from said hydrolysis, that subsequent calcination thereof at relatively low temperatures and commensurate with those normally employed in anatase pigment manufacture, induces substantially complete conversion of the anatase to rutile and yields a commercially acceptable, high-quality type of rutile pigment.

In a more specific and preferred embodiment, the invention comprises preparing a seeding agent for titanium sulfate solution hydrolysis, by combing a relatively pure solution of titanium chloride with an alkaline material in such manner that the resulting hydrous titanium oxide will be successively maintained or ripened under both alkaline and acidic conditions and specific alkaline and acidic normalities.

In description, one practical and preferred adaptation of the invention will be alluded to in which out novel seeding agent is first prepared and then used in a titanium sulfate solution hydrolysis. Since the potency of the nuclei is dependent upon the conditions prevailing during its preparation, reference will be made to those conditions which are most favorably conducive to the preparation of an optimum form of accelerator. It will be understood, however, that the invention is not limited to such preferred conditions and that variance may be resorted to without departing from its underlying spirit and scope.

In such adaptation, a relatively pure titanium chloride solution (one substantially free from iron or other undesired impurities and containing not in excess of, say, 125 g. $TiO_2$ per liter) is mixed in a suitable primary reaction or mixing vessel with a suitable alkaline or basic material, preferably sodium hydroxide. The chloride and alkali solutions so admixed are maintained at substantially room temperature or below, and preferably at a temperature not exceeding about 50° C. The solutions are incorporated with each other in such manner and such rates, proportions and liquor concentrations are employed that a substantially alkaline suspension of hydrous titanium oxide is obtained having a normality ranging from about .2 to .8 N. alkali, and preferably about .4 NaOH (determined by titration of the alkali suspension to 7.0 pH end point using brom thymol blue indicator with .1 N. $H_2SO_4$ as the titrating agent through dilution of a 25 cc. sample of the suspension to 300-400 cc.). As a result, the titanium oxide is preliminarily maintained for at least a relatively short period (usually about 1-2 minutes) in an initial alkaline environment, sufficient to initiate, promote or incipiently activate the nucleating characteristics thereof. The alkaline suspension is then converted to an acidic state, preferably to a normality of about .4 N. HCl (or a normality ranging from about .1 to 1 N. acid) by titration of the acid suspension with .4 N. HaOH to 7.0 pH end point using brom thymol blue indicator and a 25 cc. sample of the acid suspension diluted to 300-400 cc. in the titration. On conversion of the suspension to the acid side, the titanium oxide is aged, ripened or matured for a relatively short period of time, and preferably at an elevated temperature under the indicated acid conditions. If preferred, conversion from the alkaline to acid side can be conveniently effected by mixing sufficient additional acidic titanium chloride solution with the alkaline suspension to provide, preferably, a .5 N. hydrochloric acid suspension. Alternatively and in lieu of effecting said conversion in the reaction vessel containing the alkaline suspension, it may be effected in an associated or secondary mixing or reaction vessel. Whatever the manner in which the the desired $TiO_2$ acidification is accomplished, the resulting mixture or suspension is preferably heated to an elevated temperature, as already indicated, ranging, preferably, from about 75° C. to 90° C. by steam injection or otherwise, and is maintained in such elevated temperature condition for a period of time ranging from about 5 to 50 minutes to induce peptization thereof (if this is desired) but in any event to afford an essential secondary curing or ripening of the $TiO_2$ in an acidic environment to finally activate, promote or develop its desired nucleating characteristics.

The resulting $TiO_2$ seed suspension or peptized sol from the contemplated controlled treatment of hydrous $TiO_2$ under both alkaline and acidic conditions can then be employed (in amounts ranging from about 1-5%, and preferably about 3%, on the $TiO_2$ basis) directly as an accelerating agent to promote the hydrolysis of a titanium salt solution, and especially titanium sulfate. Alternatively, it may be cooled (to below 60° C. and preferably under 50° C.) prior to use and stored in such cooled condition until use thereof is desired. Cooling may be conveniently effected through the action of a suitable cooling fluid, such as air, or by quenching, through addition of a cooling medium, such as water. If avoidance of dilution is desired, the cooling operation may be effected by passing the seed suspension in indirect heat exchange relationship with the cooling medium.

We have found it desirable and therefore, prior to use, prefer to coagulate the nuclei, such coagulation being preferably effected by treating the colloidal $TiO_2$ sol with sufficient soluble sulfate (such as sodium sulfate or sulfuric acid), in accordance with the disclosure of the co-pending application of Carl M. Oleson, Serial No. 426,247, filed January 9, 1942, now Patent No. 2,479,637, issued August 23, 1947.

When employed in titanium liquor hydrolysis, our novel nucleating agent will advantageously provide increased, high yields of an improved form of titanium oxide, and especially anatase, within a relatively short hydrolysis period, and in addition will provide a form of anatase hydrolysate which, when calcined at relatively low temperatures, e. g., below substantially 1000° C. and from about 850-975° C., (normally employed in anatase pigment manufacture) will yield a substantially completely converted, high-quality rutile pigment exhibiting excellent tinting strength, color, hiding power and other essential properties. Prior to calcination we prefer to incorporate in the conventionally washed and purified hydrolysate small amounts of potassium or sodium salts, particularly the sulfates thereof, as contemplated in U. S. Patent 1,892,693. In obtaining an optimum form of pigment which exhibits exceptionally high color and brightness characteristics and other exceptional pigment values, we prefer to effect the calcination in the presence of a small amount of a mixture comprising an alkali metal salt, particularly sodium and/or potassium sulfate, and the polyvalent metal compounds adapted to yield white, insoluble oxides disclosed in the copending application of James H. Peterson, Serial No. 426,249, filed January 9, 1942 (now U. S. Patent 2,369,246, dated February 13, 1945). After calcination, the product may be subjected to the usual pigment finishing treatments, such as wet or dry grinding in pebble, Raymond or other types of mills, following which the pigment is adapted for use in all types of commercial pigment applications.

To a more complete understanding of the invention, the following specific examples are given, each being given by way of illustration but not in limitation of our invention:

Example I

A caustic soda solution, at a concentration of 260 g. per liter NaOH, is mixed in a corrosion-resistant reaction vessel with a titanium chloride solution, containing 60 g. per liter $TiO_2$ and about 98 g. per liter of active HCl, until an alkaline $TiO_2$ suspension, at a normality of about .8 NaOH, is obtained. Sufficient hydrochloric acid, at a 25% strength, is then incorporated in said alkaline suspension as will convert the same to an acidic suspension with a normality of about .5 HCl. This acid $TiO_2$ suspension is then heated to about 85° C. and is held at that temperature for about 25 minutes to effect a final curing of the $TiO_2$ and peptization to a colloidal sol. A 5% quantity, based on the $TiO_2$ present, of said sol when used in the hydrolysis (through boiling for 3 hours) of a titanium sulfate solution obtained from the sulfuric acid dissolution of ilmenite and containing about 250 g. $TiO_2$ per liter, with an F. A. value of 70, resulted in a yield in excess of 95% anatase titanium oxide. This hydrolysate, after being filtered, acid-washed and calcined for 30 minutes at a temperature of about 950° C., while mixed with a small amount of sodium sulfate (.5% on the $TiO_2$ basis) converts substantially completely to rutile to yield a high-quality pigment exhibiting increased hiding power and exceptionally high tinting strength and color.

Example II

A caustic soda solution is made up to a concentration of 271 g./l. NaOH in a large mixing tank. A titanium chloride solution containing 50 g./l. $TiO_2$ and about 82 g./l. of active HCl is stored in a nearby tank. The titanium chloride solution is added to the caustic soda solution until the mixture reaches about 1.0 NaOH, following which further additions of chloride solution are continued to provide a final $TiO_2$ concentration of 40 g./l. $TiO_2$ at an acid normality of about .45 N.HCl. This acidic suspension is then heated to about 90° C. and held at this temperature for about 20 minutes, during which further conditioning or activation of the $TiO_2$ results and a peptized, colloidal $TiO_2$ sol is obtained. The sol is then simultaneously cooled and coagulated by adding a cold solution of caustic soda thereto, sufficient to provide about 7.0 pH and as contemplated in the aforesaid Carl M. Olson application. Chlorides present are then removed from the coagulated sol by washing in a filter press, after which the seeding material is ready for use. Upon employing a 4% quantity (based on the $TiO_2$ present) of the recovered nucleating agent in the hydrolysis, by boiling for 3 hours of a titanium sulfate solution, obtained from sulfuric acid dissolution of a titaniferous ore and containing about 190 g. $TiO_2$ per liter, a 96% yield of precipitated anatase results. This hydrolysate, after the usual washing and purification treatments, yields on calcination at a temperature of about 930° C. for a period of about 30 minutes in the presence of a .2% amount of potassium sulfate (on the $TiO_2$ basis), a substantially completely converted rutile pigment greatly increased in hiding power and of exceptionally high tinting strength and color, greatly superior to commercial anatase pigments.

Example III

One liter of caustic soda, containing 240 g. NaOH, is added to 1 liter of titanium chloride solution, containing 100 g. $TiO_2$ and 182.5 g. HCl, over a 5-minute period, to give a suspension of titanium oxygen compound in about .5 N. NaOH. This suspension is allowed to age in the alkaline environment for about 3 minutes, after which 350 cc. of titanium chloride, corresponding in concentration to the original solution, is then added to the suspension. The acidic suspension is then heated to 90° C. and held at this temperature for about 15 minutes, following which it is cooled and coagulation is effected as set out in the next preceding example. The use of 3% of this seeding agent in the hydrolysis of titanium sulfate solution at a concentration of 220 g./l. $TiO_2$ yields a hydrolysate which, after calcination at about 930° C., exhibits substantially the rutile diffraction pattern on X-ray analysis and possesses excellent pigment properties, especially improved hiding power, tinting strength and color.

Example IV

A solution of titanium chloride, containing 100 g./l. $TiO_2$ and 182.5 g./l. active HCl, and a caustic soda solution containing 240 g./l. NaOH are simultaneously added to a suitable mixing vessel, the rates of addition being so adjusted that an alkaline suspension, containing about .6 N. NaOH, results. This mixture or suspension is then added to a relatively pure titanium chloride solution, similar in composition to that used initially in effecting the simultaneous strike. The amounts of titanium chloride solution and caustic solution used in the simultaneous strike as well as the titanium chloride solution into which the simultaneous strike mixture is introduced are adjusted to provide a final suspension containing 41 g./l. $TiO_2$ and .5 N. HCl. The resulting acid suspension is then heated to 90° C. and held at this temperature for about 15 minutes, following which cooling and coagulation of the peptized material is effected in the manner set forth in Example II. The use of this seed at a 5% level in the hydrolysis of titanium sulfate solution having a 210 g./l. $TiO_2$ concentration and an F. A. (free acid) value of 70, yields a product which readily converts to rutile at about 930° C. and exhibits high hiding power, tinting strength and color values.

Example V

A solution of titanium chloride containing 100 g./l. $TiO_2$ and 182.5 g./l. active HCl and a caustic soda solution containing 216 g./l. NaOH are simultaneously added to a mixing vessel at adjusted rates to give an alkaline suspension containing .2 N. NaOH. To this alkaline suspension is then added sufficient HCl to give about .52 N. HCl. This acid suspension is then heated to 70° C. and held at this temperature for about 100 minutes. Cooling and coagulation is effected as in Example IV. The use of this seeding agent at the 5% level in the hydrolysis of titanium sulfate solution having a 210 g./l. TiO₂ concentration and a F. A. (free acid) value of 70, yields a hydrolysate which upon calcination at about 930° C. readily converts to rutile of high pigment quality.

*Example VI*

Orthotitanic acid was precipitated by adding 800 parts by volume of TiCl₄ solution containing 240 g. TiO₂ per liter to 298 parts by volume of a solution of NaOH containing 151 g. NaOH per liter to give a suspension containing 57 g. TiO₂ per liter at pH=6.7. The precipitate was washed and was then reslurried in HCl at concentration of 35 grams TiO₂ per liter and 0.35 normal with respect to HCl. The acidified suspension was heated to 80° C. and held at this temperature for 20 minutes to effect peptization. The seed was employed in the hydrolysis of commercial titanium sulfate solution under conditions similar to those described in Example I, but employing a 5% seed addition (on the TiO₂ basis). The raw pigment obtained converted to rutile at 960° C. which is lower than the conversion temperature of raw pigments prepared by seeding the hydrolysis in accordance with prior art methods. The finished rutile pigment obtained by calcinating the hydrolysis precipitate at 975° C. possessed high tinting strength and excellent color.

The tinting strength, color, crystal structure, etc., herein referred to, were determined in accordance with the methods referred to or described in the aforesaid United States patent to James E. Booge No. 2,253,551.

The dual-conditioned nucleating agent obtained from this invention, by subjecting titanium oxide to a plurality of successive treatments under controlled conditions with respect to both alkalinity and acidity, consists of an improved form of hydrolysis accelerator having many novel attributes and characteristics lacking in prior TiO₂ seeding or hydrolysis nucleating agents. It not only has the unique characteristic of so affecting the properties of an anatase hydrolysate that said anatase will convent to rutile when calcinated at relatively low temperatures, e. g., of the order normally used in anatase pigment manufacture, but has many other novel and distinguishing features, particularly in respect to particle size, solubility, rutile crystallinity, etc. Thus, in contradistinction to the relatively coarse character, difficultly soluble and dispersible nature of prior agents, it comprises an extremely finely-divided type of material, as is clearly evidenced from a consideration of its specific surface area values which range from about 200–275 square meters and preferably from about 220 to about 260 square meters per gram of finely-divided material (as measured by the adsorption method described by Professor J. H. Emmett of Johns Hopkins University in the Analytical Edition of Industrial and Engineering Chemistry, dated January 15, 1941). Having a 30–40% solubility in 50% H₂SO₄ at 110° C., the seeding agent is advantageously less resistant to such acid solution than prior agents. These characteristics are very advantageous, the extremely finely-divided condition of the agent providing in the hydrolysis a greater number of nuclei per unit weight with a consequently greater potential for promoting and accelerating nucleation and hydrolysis. Its finely-divided condition increases its solubility characteristics, its rate of dispersion throughout the solution being nucleated becomes advantageously increased to reduce greatly the time required for effective and efficient nucleation and the overall time consumed in the hydrolysis. Also, the finely-divided type of seeding material is exceedingly advantageous in the hydrolysis for effecting a control over the particle size of the ultimate TiO₂ pigment, since the smaller and the greater the number of nuclei the smaller will be the radius of the individual particles upon hydrolysis completion.

Again, our novel form of nuclei, when subjected to X-ray analysis following heat treatment at temperatures ranging from above 100° C. and up to, say, about 550° C., will reveal a rutile diffraction pattern ranging from about 10 to 95 or 100%, whereas prior nucleating agents, even though obtained from titanium chloride solutions (U. S. 2,062,133) will not exhibit any rutile diffraction lines when treated and examined under comparable conditions. Our optimum form of seed will exhibit the crystalline form of rutile upon heating at temperatures ranging from 300–350° C. The physical disparity in respect to rutile crystallinity between a prior seed and one obtained in accordance with this invention, when calcined alone, is demonstrated by the following table, in which seed A consists of our novel agent, while seed B is of prior art type:

| Seed | Per Cent Rutile | When Calcined |
|---|---|---|
|  | 500 | 550 |
| A | 80 | 95 |
| B | 0 | 0 |

The use of our novel nucleating agent (which in the final pigment is indistinguishable chemically) thus enables one to obtain a final, unextended, straight rutile pigment of a high degree of purity, which will have an average particle size diameter within an optimum range of about .2 to .5 micron, with brightness values of at least 92% (and preferably above 95%) of that of MgO, and hiding power values of 120 or above and preferably above 130.

The values of our novel seeding agent for producing an improved form of anatase-converted rutile pigment possessing improved pigment characteristics, exceptionally high tinting strength and color or brightness is particularly illustrated when the above seeds A and B are separately employed in the hydrolysis of titanium sulfate solutions, using an amount of seed suspension equivalent to 5% on the TiO₂ basis in each instance to nucleate the titanium sulfate solution which contained 215 g. TiO₂ per liter and 1.7 mols H₂SO₄ per mol TiO₂. The separately seeded liquors were heated gradually to boiling and boiled for a period of one and a half hours to effect hydrolysis. The precipitated TiO₂ (anatase) formed in such hydrolyses was washed in the usual manner, acid digested in dilute H₂SO₄, washed, treated with a small amount of alkali metal salt (0.75% on the TiO₂ basis of a mixture of K₂SO₄—80% and Na₂SO₄—20%), dried at 110° C. and finally calcined. The calcined product was wet ground and dry ground according to well-known procedures for finishing TiO₂ pigments.

The anatase raw pigments obtained by use of seed A in such hydrolysis converted to rutile at substantially lower temperatures than the raw pigment obtained from the use of prior art seed B. The finished, rutile pigments obtained by use of seed A were superior in tinting strength, hiding power and color to the corresponding products obtained by use of prior seed B, as evidenced from the following data:

| Seed | Calcining Temperature | Per Cent Rutile | Tinting Strength | Hiding Power | Color |
|---|---|---|---|---|---|
| A | 930 | 95 | 190 | 135 | 17:3 Y |
|   | 950 | 100 | 195 | 140 | 17:2 Y |
| B | 975 | 0 | 145 | 100 | 16:0 |
|   | 1,100 | 90 | 110 | 70 | −10:6 Y |

The above hiding power values refer to commercial anatase=100 as a standard, and were determined in accordance with the following method involving comparisons with a standard paint applied over a black and white background. The standard paint comprises an enamel formula containing commercial anatase pigment at a pigmentation of 3 pounds TiO₂ per gallon, the hiding power comparison being made with the rutile pigment sample formulated in the same enamel vehicle to yield equal paint hiding power. The weight of the anatase required divided by the weight of rutile in paints of equal hiding power yields the rutile pigment hiding power. For example, if a paint containing 6 g. of rutile has a hiding power equal to the standard paint containing 8 g. of anatase, the rutile hiding power equals $8 \div 6 \times 100$ or $133\frac{1}{3}\%$. The values for color, tinting strength, crystal structure, and absolute reflectance or brightness were determined in accordance with the methods described or referred to in U. S. Patent 2,253,551. The particle size values referred to herein were obtained by a turbidimetric method calibrated by the ultracentrifuge, the latter being described in U. S. Patent 2,062,134. In accordance with such color determining tests, TiO₂ pigments to be commercially useful should have a value of 10 or better for actual brightness before correction for off-tint. Designating a pigment as having a color of, say, "13:2Y" means that the pigment has an intrinsic brightness of 15 before correction for off-tint and is off-tint towards the yellow end of the spectrum to the extent of 2 points measured by the arbitrary scale employed in said test. If the pigment is given a color rating of 8:3Y, it has, in accordance with this scale, an intrinsic brightness of 11 and is off-tint to the yellow to the extent of 3 points.

While we have described our invention as applied to certain specific and preferred embodiments which advantageously fulfill the objects primarily enumerated, obviously it is not limited thereto, since the description and examples are merely given by way of illustration and not in limitation. Hence, while we have enumerated specific processes for obtaining a calcined rutile pigment characterized by improved high tinting strength, hiding power, brightness and color, through conversion of anatase, the indicated preferred modes of obtaining such form of pigment can be suitably varied. Thus, while the nucleating agent of this invention is most outstandingly useful in the hydrolysis of titanium sulfate solutions and to obtain an improved form of anatase hydrolysate readily convertible to rutile at usual or normal anatase pigment calcination temperatures, it can also be employed, if so desired, in the hydrolysis of other titanium salt solutions, including the chloride, iodide, nitrate, fluoride, oxalate, etc., whether relatively dilute or concentrated in nature. Any desired concentration of titanium solution may be employed in the hydrolysis, solutions having concentrations ranging from about 100–250 g. TiO₂ per liter being preferred for use.

Although we preferably obtain our novel seeding agent by resorting to a so-called reverse type of strike (in which a titanium chloride solution is mixed with an alkali solution by adding the former to the latter), other modes of mixing these solutions to obtain our agent can be resorted to. Thus, resort can be had to a so-called direct type of strike (wherein the alkali solution is added to the titanium liquor) or to a simultaneous type of strike (wherein the two solutions are concurrently added to a common mixing or reaction vessel and at controlled rates and concentrations). Similarly, various combinations of these or other methods of incorporating the reacting solutions in each other can be used, if desired. It is only essential and critical in the invention that the hydrous titanium oxide precipitate resulting from such admixing and which comprises our ultimate nucleating agent shall be subjected, prior to use, to a dual conditioning or ripening treatment under (a) alkaline and (b) acidic conditions, with the alkaline conditioning treatment preferably occurring first. Since a reverse type of strike is more suitable and expedient for accomplishing this dual conditioning effect, it is preferred for use, because by striking the titanium chloride solution into the alkali, an initial aging of the TiO₂ in a predominantly alkaline environment or condition necessarily takes place, following which the strike continues (through further titanium liquor additions) until conversion of the mixture to the acid side or normality results. If desired, the titanium liquor addition may be interrupted and conditioning of the hydrous TiO₂ under alkaline conditions can be advantageously prolonged for any desired extent, after which interruption further additions of the titanium liquor or monobasic acid can be effected and continued until conversion of the TiO₂ suspension to the acid state materializes. It is evident that preliminary treatment of the TiO₂ under alkaline conditions can also be effected in simultaneous and direct types of strikes by controlling the concentrations, rates and manner in which the solutions are mixed. Thus, where the alkali is added to an excess of titanium solution, the addition is so regulated and controlled that formation will take place of alkaline zones or pockets within the resulting mixture, such zones being sufficient in extent and duration that the precipitated TiO₂ flocs formed during the mixing operation will necessarily be surrounded by and maintained in a substantial alkaline environment and for the period required to effect the desired aging or curing in such environment. This can be effected, for instance, by conducting the mixing operation in such manner that a quick and rapid alkali addition to the titanium solution is had with accompanying relatively poor or weak circulation or agitation of the mixed solution. The existence and extent in terms of time during which such alkaline zones prevail within the mixture are readily ascertainable by employing an indicator such as phenolphthalein in the solution mixture. Alternatively, one may, if desired, strike directly under acid conditions, convert the strike liquor to the alkaline side, and then reconvert back to and mature under the required final acidic conditioning.

As indicated, we prefer to precipitate the hydrous $TiO_2$ used in preparing our seed in an alkaline environment. While the manner in which the titanium and alkali solutions is mixed is non-critical and a reverse type of strike comprises a preferred mode for producing a $TiO_2$ hydrate useful herein, it is essential and critical to the invention, as noted, that the precipitate be matured, aged, conditioned, cured or ripened for at least a relatively short period of time during some stage of the nuclei preparation operation under controlled conditions with respect to alkalinity and acidity. This dual conditioning treatment is conveniently effected by subjecting the precipitate to successive treatments, initially under controlled alkaline conditions and subsequently under controlled acid conditions. The alkaline environment under which such precipitate is treated should be at least substantially equal to that shown by phenolphthalein as an indicator, and ranges from in excess of about .05 N. alkali to about 2.5 N. or higher, with a range of from about .1 to 1.0 N. NaOH being optimum and preferred. The duration or extent of such alkaline treatment, though variable and somewhat dependent upon the prevailing temperatures, concentrations and normalities used, must be for a period of at least .25 minutes and may range up to 30 minutes or longer. A preferred alkali aging or conditioning time ranges from about 1 to 5 minutes at the indicated, preferred normalities. The alkali-conditioned $TiO_2$ can then be subjected to ripening or maturing under acidic conditions and at normalities ranging from in excess of about .05 N. acid up to about 2.5 N. acid or higher, with a range of from about .1 to 1. N. HCl being preferred because optimum. The length of time the $TiO_2$ is cured under acid conditions is also variable and depends upon the prevailing acidity, the concentrations, and the temperatures used. Preferably, such conditions of acid cure are employed as will induce peptization of the $TiO_2$ under treatment. Conveniently, this can be accomplished through use of a relatively strong, acidic peptizing agent which is free from sulfate or other polyvalent ions, such as, preferably, an acidic titanium chloride solution, or monobasic acids generally, such as hydrochloric or nitric acids, or of perchloric, perbromic, periodic, hypochloric or hydrobromic acids, etc. In effecting peptization, the $TiO_2$ is conveniently suspended in a dilute solution of the monobasic acid, following which the mixture is maintained at an elevated temperature (ranging from 50-90° C., and preferably from 75-90° C.) until peptization occurs and a stabilized colloidal $TiO_2$ sol results. The amount of peptizing agent used in effecting curing of the $TiO_2$ on the acid side is preferably sufficient to provide a concentration ranging from .2 to .5 N., but, if desired, may be at strengths ranging from, say, about .1 to 1 N. The time of acid curing preferably ranges from 15 to 30 minutes but may vary from 10-60 minutes or from 5 minutes up to 3 hours, depending upon the temperature and concentrations of the suspension under treatment. Generally, the lower the acid concentration and temperature used in the curing operation, the longer will be the aging time required. With higher temperatures and concentrations, shorter conditioning periods will be required.

The terms "alkalinity" or "basicity," as herein used, refer to the basic capacity of the conditioning solution or suspension measured, preferably, as normality (free alkalinity or amount of action); while the term "acidity" refers to the reciprocal of alkalinity, measured by either the degree or amount of acidity present. As already indicated, normality determinations are ascertainable by titration, e. g., alkalinity being determined by titrating the supernatant alkaline liquid with standard acid, and acidity being ascertained by titrating the acidic liquid with a standard caustic solution.

While we usually prefer to employ a sodium hydroxide or caustic soda solution of relatively concentrated strength, because such type of solution is readily available at relatively low cost, more dilute alkali solutions as well as other forms of alkaline agents may be substituted for or used in conjunction with such preferred agent for reaction with the titanium salt solution. Any type of soluble base, especially the alkali metal hydroxides or carbonates, such as those of sodium or potassium, as well as ammonium hydroxide or carbonate or the alkaline earth metal hydroxides, will be found suitable for use in the invention. Alkaline earth metal hydroxides, particularly those of calcium, barium, magnesium or strontium, are especially desirable for use when titanium chloride solutions are employed since avoidance is then had of an alkaline earth sulfate precipitate which might to some extent hinder subsequent processing of the seeding agent.

As indicated, the concentration of the alkali reagent may be varied over wide limits, the amounts selected for use being such as will provide a reasonable $TiO_2$ concentration after admixture with the titanium salt solution. As stated, the two solutions are mixed in such ratios and amounts that an alkalinity equivalent to from about .05 to 2.0 NaOH results, under which conditions the titanium precipitates as the hydrate. Preferably, also, an amount and type of alkali is selected as will provide a titanium hydrate in the reaction mixture ranging in concentrations from about 10-50 g./l., thereby avoiding relatively thick slurries which would be difficult to agitate, or the procurance of concentrations of less than 10 g. $TiO_2$ per liter because too thin in nature and requiring mixing, reaction or treating vessels of excessively large size.

The preferred titanium salt solution from which the seeding agent of this invention is prepared comprises relatively pure titanium chloride. Other monobasic acid titanium solutions or salts, such as titanium nitrate, iodide, etc., or mixtures thereof, can be used, if desired. Titanium sulfate solutions may be also used, provided care is taken to remove soluble polyvalent anions from the hydrous $TiO_2$ precipitated therefrom, the presence of which would inhibit rutile formation. Anion removal can be conveniently effected, for instance, by repeated filtering and washing. The concentration of the titanium solution so employed is also variable over rather wide limits, concentrations of from about 50 to 150 g. $TiO_2$ or more per liter being sufficient for most practical purposes. Obviously, one may employ a relatively concentrated titanium salt solution with a more dilute form of alkali solution to obtain a titanium hydrate suspension in the desired $TiO_2$ concentration. As indicated above, the concentration of the starting titanium solution may range up to 125 g. TiO₂ per liter with a preferred concentration comprising one in relatively dilute form.

The temperature of the solution obtained as a result of mixing the titanium and alkali solution is preferably that of the room or lower and the rate of admixture of the titanium solution with the base is such that the temperature of the suspension does not exceed, say, about 35° C. In some instances, it may be found desirable to cool the solutions and the resulting suspension with ice or other type of refrigerant during the processing.

Conversion of the alkali-conditioned hydrous TiO₂ suspension to an acidic state and within a preferred range of from about .05 to 1 N. HCl may be effected, as a stated, by mixing therewith sufficient titanium chloride or other acidic agent until the mixture becomes acid and within, say, the indicated preferred normality. Such conversion is preferably effected by adding a portion of the original titanium solution used in preparing the hydrated suspension to the basic or alkaline suspension. The acid normality of the suspension during the secondary conditioning treatment will be found to bear importantly upon and affect to a considerable degree the potency of the hydrate as a nucleating agent.

After the hydrous TiO₂ has been subjected to the dual conditioning treatment herein contemplated, the resulting sol may be used directly as a nucleating or accelerating agent in the hydrolysis of a titanium salt solution, and especially titanium sulfate solution, the amounts of required seeding agent for the purpose being relatively small and ranging from about 1-5% or to as high as 10%, said amounts being on the TiO₂ basis. As already stated, we prefer to coagulate the peptized sol prior to use, this being conveniently effected by incorporating in said sol a suitable coagulant, such as a soluble base, and more particularly in accordance with the disclosure of the said Carl M. Olson application, Ser. No. 426,247, filed January 9, 1942. The amount of coagulant so used should be calculated to provide a substantially neutral suspension and the coagulated product should be washed substantially free of chloride and other ions or electrolysts prior to use as a seed.

The novel accelerating agent of this invention having the desirable characteristics of providing on hydrolysis of a titanium sulfate solution both high TiO₂ yields and a form of anatase precipitate which will convert to rutile at relatively low temperatures and of the order of those normally employed in anatase pigment manufacture, its use in such production is obviously preferred. However, it is not limited to such uses but, as already indicated, can be employed in the hydrolysis of all types of titanium salt solutions and whether anatase or rutile, or mixtures of both anatase and rutile, are desired as the final precipitate or pigment.

While calcination temperatures ranging from substantially 850-975° C., and not exceeding substantially 1000° C., are indicated as preferred for use in the invention because they afford optimum benefits hereunder, lower or higher temperatures can also be employed. The use of any particular temperature or range thereof will largely depend upon the composition or inherent nature of the titanium oxide under treatment, the particular pigment properties to be developed and the crystallinity or amount of rutile which it is desired that the finished pigment shall exhibit. In effecting conversions to rutile, we utilize such calcination temperatures and times as will promote or effect conversion of at least a major portion of the TiO₂ under treatment, and preferably a conversion of at least 80% thereof. In obtaining optimum benefits hereunder, we prefer to utilize such temperatures as will effect from substantially 90-100% conversions and in excess of substantially 95% conversion. Hence, temperatures ranging to as low as substantially 750° C. and to as high as 1050° C. or 1100° C. can be employed where necessary to promote or effect the pigment development or rutile conversion desired. Accordingly, the term "calcining to develop pigment properties", as used herein and in the appended claims, includes that degree and time of elevated temperature treatment to which a raw pigment hydrolysate or precipitate is subjected in order to impart thereto or develop therein such properties as requisite tinting strength, hiding power, color, oil absorption, crystallinity, &c.

While the invention has been particularly described as applied to the production of "straight" or unextended forms of titanium oxide pigments, it can be also applied to the production of mixed or extended forms of TiO₂ pigments, containing varying amounts of other prime pigments such as ZnS, lithopone, ZnO, leaded ZnO, metallic titanates, etc., of such inorganic extenders, as barium sulfate, calcium sulfate, calcium carbonate, magnesium silicates, etc., or mixtures thereof, and which have been either precipitated upon or coprecipitated or blended with the titanium oxide during its manufacture, processing or finishing, the TiO₂ component of such mixed or extended pigment, which can usually be isolated by known methods, exhibits the pigment values which have been already alluded to.

The term "titanium oxide" or "hydrous titanium oxide" used herein or in the appended claims is employed in the generic sense and includes the uncalcined TiO₂ precipitates obtained from the neutralization or dilution of a titanium salt solution. It also includes precipitates obtained through hydrolysis as by the heating of dilute hydrolyzable titanium salt solutions. These precitates are usually referred to as hydrated titanium oxide, hydrous titanium dioxide, metatitanic acid, orthotitanic acid, and the like. Similarly, the term applies to any precipitate obtained from other procedures, such as through the reduction of solutions of sodium pertitanate. Hence, it includes any such titanium oxide precipitates having water associated therewith which may vary over rather wide limits of hydration and often contain adsorbed anions from the titanium salt solution employed in their production.

We claim as our invention:

1. A process for producing a dual-conditioned, activated TiO₂ nucleating agent for titanium sulfate solution hydrolysis which comprises mixing a monovalent anion titanium salt solution with sufficient alkali solution to precipitate all of its titanium content as hydrous titanium oxide and initially maintain the latter for a period of at least one-quarter of a minute as an alkaline suspension, and subsequently maintaining the resulting alkaline-treated product in a surrounding acidic environment ranging from .1 to 1. N and at an elevated temperature until the nucleating characteristics of said TiO₂ are developed.

2. A process for producing a dual-conditioned, activated TiO₂ nucleating agent for titanium sulfate solution hydrolysis which comprises reacting a titanium chloride solution with a solution of an alkali sufficient to precipitate all of its titanium content as hydrous titanium oxide, maintaining the resulting $TiO_2$ precipitate initially and for a period of at least one-quarter of a minute as an alkaline suspension at a normality ranging from about .05 to 2.5 N. alkali and thereafter maintaining the alkali-treated product in a surrounding acidic environment ranging from about .1 to 1.0 N. acid and at an elevated temperature ranging from 50–100° C. until the nucleating characteristics of said titanium oxide are finally developed.

3. A process for producing a dual-conditioned, activated $TiO_2$ nucleating agent for titanium sulfate solution hydrolysis which comprises reacting a titanium chloride solution with a solution of an alkali to precipitate as hydrous titanium oxide all of the titanium content of said chloride solution, maintaining the resulting $TiO_2$ precipitate initially and for a period ranging from about 1–5 minutes in a surrounding alkaline environment ranging from about .1 to 1.0 N. alkali, and thereafter maintaining the alkali-treated product in a surrounding acidic environment ranging from about .1 to 1.0 N. acid and at an elevated temperature ranging from 50–100° C. until the nucleating characteristics of said titanium oxide are finally developed.

4. A process for producing a dual-conditioned, activated $TiO_2$ nucleating agent for titanium sulfate solution hydrolysis which comprises adding a solution of a titanium chloride to an alkali solution to precipitate all of the titanium content of said chloride solution as hydrous $TiO_2$ and maintain said precipitate initially and for at least one-quarter of a minute in an alkaline environment, continuing titanium chloride solution addition to said alkali solution until it becomes converted to an acidic state, the normality of which ranges from .1 to 1 N., and then maintaining the resulting acidified hydrous $TiO_2$ suspension at an elevated temperature until the nucleating characteristics of said $TiO_2$ are finally developed.

5. A process for producing a dual-conditioned, activated $TiO_2$ nucleating agent for titanium sulfate solution hydrolysis which comprises separately and simultaneously introducing a titanium chloride solution and an alkali solution into a reaction vessel, employing such concentrations of reactants and rates of addition of solutions to said vessel that all of the titanium content of said chloride solution is precipitated and the suspension of hydrous precipitated $TiO_2$ which results is maintained initially, and for a period of at least one-quarter of a minute, in an alkaline $TiO_2$ suspension, the normality of which ranges from .1 to 1.0 N. alkali, thereafter converting the alkali suspension to an acidic suspension having a normality ranging from .1 to 1 N., and then maintaining the latter suspension at an elevated temperature until the nucleating characteristics of the treated $TiO_2$ product become finally developed.

6. A process for producing a dual-conditioned, activated $TiO_2$ nucleating agent for titanium sulfate solution hydrolysis which comprises adding a solution of a base to an acidic monovalent titanium salt solution to precipitate all of the titanium content of said titanium salt solution as hydrous $TiO_2$ in suspension, continuing addition of said basic solution until said titanium solution is .05 to 2.5 N. alkali, maintaining said hydrous $TiO_2$ precipitate in said alkaline environment for a period of at least one-quarter of a minute, thereafter converting the alkaline $TiO_2$ suspension to an acidic $TiO_2$ suspension having a normality ranging from .1 to 1 N. by adding sufficient titanium chloride solution thereto, and then maintaining said acidified $TiO_2$ suspension at an elevated temperature until its nucleating characteristics become finally developed.

7. A process for producing a dual-conditioned, activated $TiO_2$ nucleating agent for titanium sulfate solution hydrolysis which comprises precipitating hydrous titanium oxide in suspension by adding a titanium chloride solution to a solution of a base until all of the titanium content of said chloride solution is precipitated as hydrous $TiO_2$, thereupon maintaining said $TiO_2$ precipitate in an alkaline environment ranging from .1 to 1.0 N. alkali, for a period ranging from one-quarter of a minute to thirty minutes, thereafter converting the alkaline $TiO_2$ suspension to an acidic $TiO_2$ suspension having an acid normality ranging from .1 to 1.0, and then maintaining such acidified $TiO_2$ suspension for a period of from about 10–60 minutes at said normality and at a temperature ranging from 50–100° C. until the nucleating properties of said $TiO_2$ are finally developed.

8. A process for producing a dual-conditioned, activated $TiO_2$ nucleating agent for titanium sulfate solution hydrolysis which comprises precipitating hydrous titanium oxide in suspension by adding a titanium chloride solution to a solution of a base until all of the titanium content of said chloride solution is precipitated as hydrous $TiO_2$, maintaining the resulting $TiO_2$ precipitate initially and for a period ranging from about 1–5 minutes in an alkaline environment ranging from about .1 to 1.0 N. alkali, thereafter converting the alkaline $TiO_2$ suspension to an acidic $TiO_2$ suspension having a normality ranging from .1 to 1.0 N. acid, and then maintaining said acidic $TiO_2$ suspension at a temperature ranging from 50–100° C. for a period ranging from about 10–60 minutes to finally develop the nucleating properties of said titanium oxide.

9. A process for producing a dual-conditioned, activated $TiO_2$ nucleating agent for titanium sulfate solution hydrolysis which comprises precipitating hydrous titanium oxide in suspension by adding a solution of titanium tetrachloride to a sodium hydroxide solution and until all of the titanium content of said tetrachloride solution is precipitated, maintaining the resulting precipitate while in suspension and for a period of from 1–5 minutes in an alkaline environment ranging from .1 to 1.0 N. NaOH, thereafter converting said alkaline suspension to an acidic $TiO_2$ suspension having a normality ranging from .1 to 1.0 N. HCl, and then maintaining said acidified suspension at a temperature ranging from 50–100° C. and for a period ranging from about 10–60 minutes to develop the final nucleating characteristics of said titanium oxide.

10. A process for producing a dual-conditioned, activated $TiO_2$ nucleating agent for titanium sulfate solution hydrolysis, comprising precipitating hydrous titanium oxide by adding a titanium tetrachloride solution to a solution of sodium hydroxide and until all of the titanium content of said tetrachloride solution becomes precipitated, initially maintaining the resulting $TiO_2$ precipitate while in suspension in the alkaline environment of said sodium hydroxide solution having a normality of from .1 to 1.0 N. NaOH for a period of from 1–5 minutes, thereafter peptizing and finally curing said titanium oxide in an acidic environment by suspending it in a dilute solution of a monobasic acid at an acid normality of from .2 to .5 N., and maintaining the acidic $TiO_2$ suspension at a temperature of from 75-90° C. for a period of from about 15 to 30 minutes and until a stabilized, colloidal $TiO_2$ sol is obtained.

11. A process for producing a dual-conditioned, activated $TiO_2$ nucleating agent for titanium sulfate solution hydrolysis, comprising separately and simultaneously introducing a titanium chloride solution and a sodium hydroxide solution into a reaction vessel, employing such concentrations of reactants and rates of addition of solutions thereto that all of the titanium content of said chloride solution is precipitated as hydrous $TiO_2$, an alkaline $TiO_2$ suspension results and the precipitated hydrous $TiO_2$ present in said vessel is maintained therein for a period of at least one-quarter of a minute in an alkaline environment at a normality ranging from .1 to 1.0 N. alkali, thereafter introducing the alkaline $TiO_2$ suspension from said vessel into a titanium chloride solution wherein said alkaline suspension becomes converted to an acidic $TiO_2$ suspension having a normality ranging from .1 to 1.0 N., and then maintaining the resulting acidified $TiO_2$ suspension at temperatures ranging from 50-100° C. until the nucleating characteristics of its $TiO_2$ content become developed.

CARL MARCUS OLSON.
JAMES ELIOT BOOGE.

REFERENCES CITED

The following references are of record in the file of this patent:

UNITED STATES PATENTS

| Number | Name | Date |
|---|---|---|
| 2,062,133 | Kubelka et al. | Nov. 24, 1936 |
| 2,303,307 | Tillman et al. | Nov. 24, 1942 |

FOREIGN PATENTS

| Number | Country | Date |
|---|---|---|
| 310,949 | Great Britain | Dec. 12, 1929 |

OTHER REFERENCES

Weiser et al.: Journal of Physical Chemistry, volume 38 (1934), pages 513-519.

Certificate of Correction

Patent No. 2,511,218                                                                        June 13, 1950

CARL MARCUS OLSON ET AL.

It is hereby certified that errors appear in the printed specification of the above numbered patent requiring correction as follows:

Column 3, line 24, for "combing" read *combining*; line 61, for the word "and" read *end*; line 74, for "HaOH" read *NaOH*; column 4, line 57, for "1947" read *1949*; column 7, line 15, for "298 parts" read *928 parts*; line 33, for "calcinating" read *calcining*; lines 51 and 52, for "convent" read *convert*; same line 52, for "calcinated" read *calcined*; column 14, line 47, for "precitates" read *precipitates*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*